Patented Mar. 9, 1954

2,671,789

UNITED STATES PATENT OFFICE 2,671,789

PRODUCTION OF N-PHENYL PYRROLE

Joseph Paul Copes and Donald Leask Fuller, Easton, Pa., and Clyde McKinley, Westfield, N. J., assignors to General Aniline & Film Corporation, New York, N. Y., a corporation of Delaware No Drawing. Application September 7, 1951, Serial No. 245,636

1 Claim. (Cl. 260—313)

This invention relates to a new process for producing N-aryl-substituted pyrroles, by vapor phase catalytic dehydrogenation of the corresponding N-arylpyrrolidine.

In U. S. P. 2,421,650 there is described a process for producing pyrroles and hydrogenated pyrroles by subjecting a 1,4-dihydroxy alkyl compound of the general formula

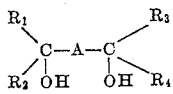

(in which A represents

—CH$_2$—CH$_2$—, —CH=CH— or C≡C— and R$_1$, R$_2$, R$_3$, and R$_4$ are hydrogen or alkyl groups) together with ammonia or primary alkyl-, cycloalkyl-, aralkyl- together with ammonia or primary alkyl-, cycloalkyl-, aralkyl- or aryl means to the action of a dehydrogenation catalyst in vapor phase. We have found that pyrrolidine and N-substituted pyrrolidines are produced in good yield by this process but that pyrrole and N-alkyl or N-aryl substituted pyrrols are produced in somewhat lower yields since the acetylenic diols employed by their production are somewhat unstable to heating.

We have now found that N-aryl pyrroles may be obtained in good yield by vapor phase catalytic dehydrogenation of N-aryl pyrrolidines, such as those prepared by the reaction of saturated 1,4-diols by the process of said patent, and that by first preparing the N-aryl pyrrolidine by said process and then catalytically dehydrogenating the same the overall yield of N-aryl pyrrole is substantially improved.

In practicing the present invention there may be employed as the dehydrogenation catalyst the metals (having an atomic number less than 79) and the oxides of the metals of groups VI and VIII of the periodic table, e. g., such dehydrogenation catalyst as nickel, platinum, palladium, ferric oxide, chromic oxide, vanadium oxide, titanium oxide and the like may be used, either alone or in admixture with each other or other dehydrogenation catalysts and, if desired, deposited on such carriers such as pumice, diatomaceous earth, silica gel, bauxite; asbestos, alumina and the like. Such dehydrogenation catalyst as those employed for the dehydrogenation of, for example, ethanol with ammonia or certain saturated heterocyclic rings may be employed in practicing the present invention.

The dehydrogenation of the N-aryl pyrrolidines to the corresponding N-substituted pyrrole is effected by contacting the N-aryl pyrrolidine in vapor phase with the dehydrogenation catalyst. Temperatures of about 300–600° C. may be employed, the optimum temperature for maximum yield depending on the particular pyrrolidine being dehydrogenated and also on the catalyst, i. e., for N-phenylpyrrolidine a temperature of 400–500° C. Such optimum temperature for any particular compound may readily be determined by preliminary experiment.

The following specific example will illustrate the details of the present invention:

Example I

N-phenyl-pyrrolidine was vaporized and vapors, heated to 450° C., were contacted with a dehydrogenation catalyst, also at 450° C., having the following analysis:

20% Fe$_2$O$_3$
1% Cr$_2$O$_3$
79% Al$_2$O$_3$

¼ gram mole of N-phenol pyrrolidine being fed per hour per liter of volume of catalyst. The reaction product was condensed and distilled from powdered copper, N-phenyl pyrrole being recovered in 33 per cent yield. There was also recovered a small amount of α-phenyl pyrrole from the reaction product.

As previously indicated the process of the present invention is applicable generally to the preparation of N-aryl pyrroles from pyrrolidines. In the above described process, N-o-tolypyrrole may be obtained from N-o-tolyl pyrrolidine, N-p-tolyl pyrrole from N-p-tolyl pyrrolidine and N-phenyl-2,5-dimethyl pyrrole from N-phenyl-2,5-dimethyl pyrrolidine and N-m-anisylpyrrole from N-m-anisylpyrrolidine.

We claim:

The process of producing N-phenyl pyrrole which comprises contacting N-phenyl pyrrolidine in vapor phase and at a temperature of 450° C. with a dehydrogenation catalyst having substantially the following analysis:

20% Fe$_2$O$_3$
1% Cr$_2$O$_3$
79% Al$_2$O$_3$

JOSEPH PAUL COPES.
DONALD LEASK FULLER.
CLYDE McKINLEY.

References Cited in the file of this patent

UNITED STATES PATENTS

| Number | Name | Date |
|---|---|---|
| 2,382,915 | Rogers | Aug. 14, 1945 |
| 2,393,132 | Wagner | Jan. 15, 1946 |

FOREIGN PATENTS

| Number | Country | Date |
|---|---|---|
| 515,865 | Great Britain | Dec. 15, 1939 |
| 554,102 | Great Britain | June 21, 1943 |
| 556,156 | Great Britain | Sept. 22, 1943 |